United States Patent

[11] 3,588,711

[72] Inventor Eugeniusz Antoszewski
Stafford, England

[21] Appl. No. 817,738
[22] Filed Apr. 21, 1969
[45] Patented June 28, 1971
[73] Assignee The English Electric Company Limited
London, England
[32] Priority Apr. 23, 1968
[33] Great Britain
[31] 19161/68

[54] FREQUENCY DISCRIMINATORS
7 Claims, 2 Drawing Figs.

[52] U.S. Cl. 328/140, 307/214, 307/215, 328/206, 328/207
[51] Int. Cl. H03b 3/04
[50] Field of Search 328/140, 207, 206, 127; 307/273, 233, 218, 214, 215

[56] References Cited

UNITED STATES PATENTS

| | | | |
|---|---|---|---|
| 3,146,432 | 8/1964 | Johnson | 328/140 |
| 3,223,929 | 12/1965 | Hofstad et al. | 328/140X |
| 3,383,546 | 5/1968 | Chopey | 307/273X |
| 3,386,498 | 6/1968 | Funfstuck | 307/273X |

*Primary Examiner*—John S. Heyman
*Attorneys*—Misegades and Douglas, Keith Misegades and George R. Douglas, Jr.

ABSTRACT: A frequency discriminator comprises a first monostable responsive to input signals of two different frequencies and operable to develop one output for conditioning a first coincidence gate during its unstable period and another output to condition a second coincidence gate during its stable period. A second monostable is triggered-on by a first monostable and a common pulse is developed therefrom to condition both the first and the second gates upon this second monostable switching from its unstable to its stable state. With this arrangement the first gate produces an output in response to the input signals effecting a frequency change in one sense whilst the second gate produces an output in response to a frequency change in the other sense.

FREQUENCY DISCRIMINATORS

Figure 1:
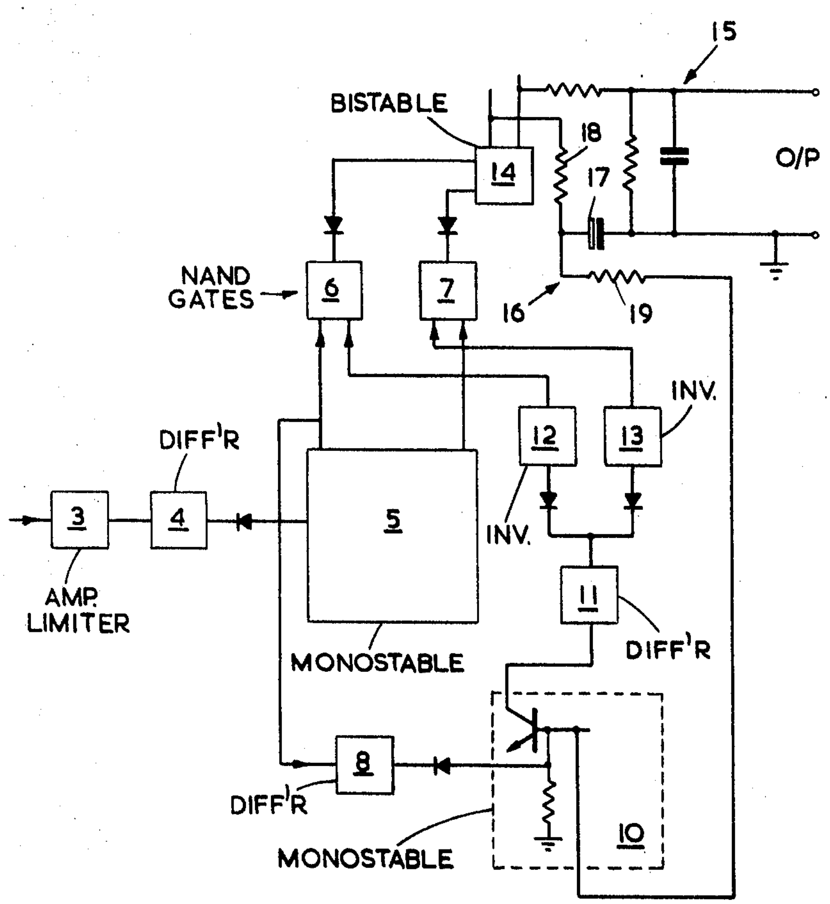

This invention relates to frequency discriminators, and is particularly, but no necessarily exclusively, designed for use in receivers in a telemetry system employing frequency shift modulation, i.e. in which data is transmitted as two different frequencies occurring sequentially in time.

From one aspect, the present invention provides a frequency discriminator responsive to input signals of two different frequencies, comprising a first monostable circuit triggered-on during each cycle of the signals and operable to develop one output to condition a first coincidence gate during its unstable period and develop another output to condition a second coincidence gate during its stable period, a second monostable circuit triggered-on upon the transition of the first monostable from its unstable to its stable state, and a differentiator for developing a pulse to condition both gates upon the transition of the second monostable from its unstable to its stable state, whereby the first gate produces an output following coincidence between this pulse and the said one output from the first monostable in response to the input signals effecting a frequency change in one sense and the second gate produces an output following coincidence between this pulse and the said other output in response to a frequency change in the other sense.

Preferably, the two gates are connected to a bistable circuit so that it assumes one state following an output from the first gate and another state following an output from the second gate; in this manner "mark" and "space" periods are produced in correspondence with the two different frequencies.

The unstable (delay) period of the first monostable is less than the period of either input signal in order for it to be triggered-on during each cycle but the unstable period of the second monostable may extend over any selected number of cycles of the input signal, as desired. In this manner the detection of a frequency change may be delayed so as to be effective only after, say, two or three cycles following the change by which time any transient disturbances which would otherwise tend to cause malfunction can reasonably be assumed to be of insignificant proportions.

A "time control" circuit may be provided at the output for ensuring that the mark-space periods are equal if the input signals are regularly alternating between their two frequencies, this circuit including a storage capacitor in a feedback network from the output of the bistable to the second monostable for governing the unstable period of the latter. This same control circuit may also compensate for natural drifts affecting this period.

As mentioned above, the frequency discriminator according to this invention may be used in a receiver in a telemetry system employing frequency shift modulation, the signal alternating between the two frequencies mentioned which may conveniently be in the voice frequency range so that Post Office telephone lines may be used between transmitter and receiver. The telemetry system may operate as a frequency division multiplex scheme in which signals from a number of transmitters are transmitted to a like number of receivers over a single pilot wire, and may in fact be in accordance with the disclosure in our copending Patent application No. 19162/68.

Figure 2:
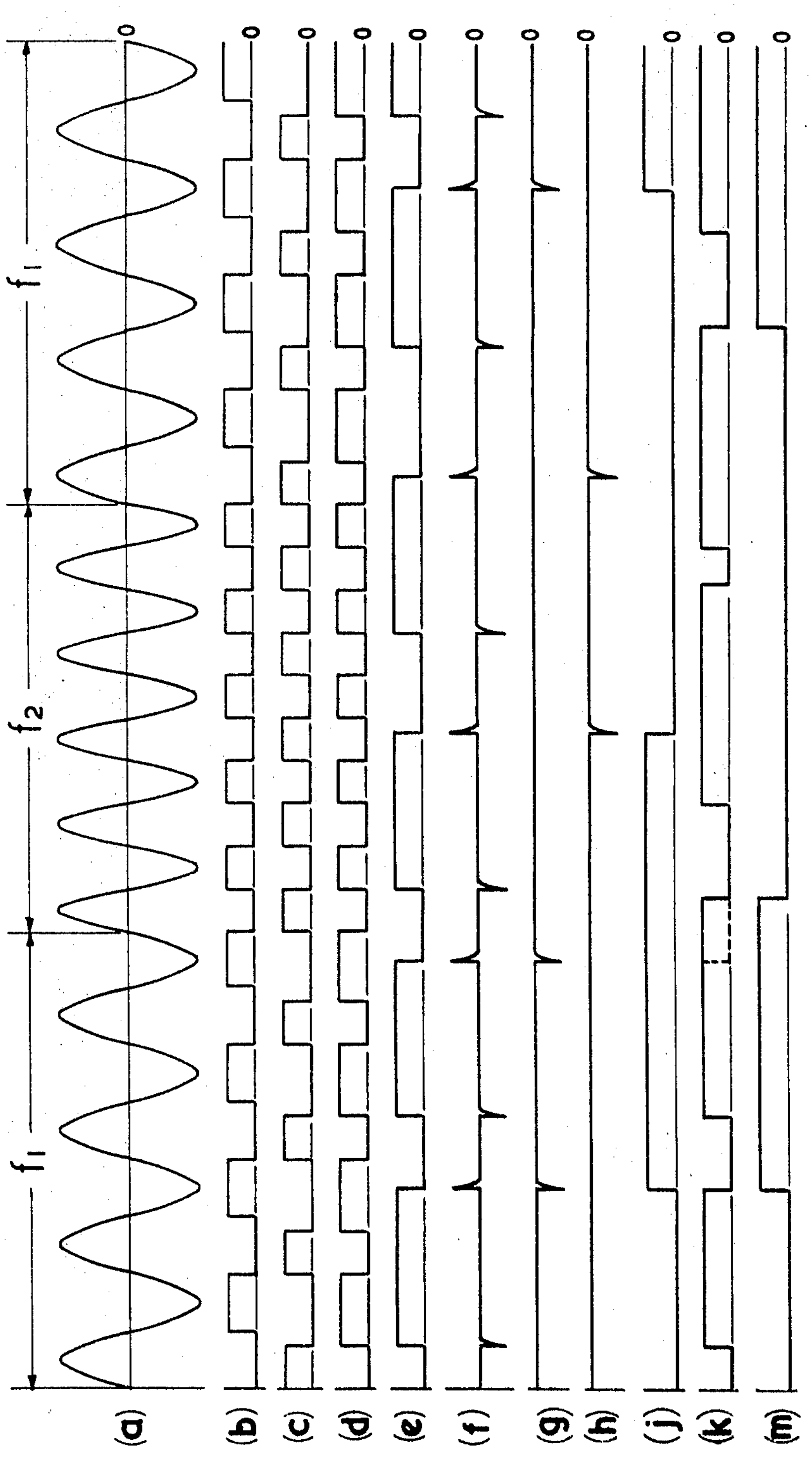

In order that the invention may be fully understood, one embodiment thereof will now be described with reference to the accompanying drawings, in which:

FIG. 1 is a schematic circuit diagram of the frequency discriminator according to this invention embodied in a receiver; and FIG. 2 illustrates waveforms obtaining at various positions in the circuit shown.

Referring now to the drawings, the input signals which alternate between two different frequencies *f*1 and *f*2 (FIG. 2(*a*)) are amplified, amplitude-limited and then amplified again in an amplifier limiter 3, the resultant square wave signal being inverted (FIG. 2(*b*)), and then differentiated in a differentiator 4. The negative differentiated pulse, which occurs at the positive-going transition of the alternating input signal, is applied to trigger-on a monostable multivibrator 5 the two outputs from which (FIGS. 2(*c*) and 2(*d*)) are applied to one input of each of two NAND gates 6, 7, respectively.

The output (FIG. 2(*c*)) is additionally differentiated in another differentiator 8 and employed to trigger-on a monostable multivibrator 10 (FIG. 2(*e*)), there being a finite period, e.g. a quarter cycle at the higher frequency *f*2, following the reversal of the monostable to its stable state during which its "inertia" is sufficient to prevent the differentiated output from immediately triggering it "on" again. The output from this monostable is differentiated in a further differentiator 11, inverted in separate inverters 12, 13 (FIG. 2(*f*)) and applied to the other inputs of each NAND gate 6, 7 respectively. The NAND gate gives a false (0) output when all its inputs are true (1) simultaneously; in other conditions it gives a true output. The output effective from the NAND gates 6, 7 is the false 1 (0) and this is applied to NPN transistors in a bistable multivibrator 14. In particular, for the lower frequency *f*1 the output is effective from the NAND gate 7 (FIG. 2(*g*)) and for the higher frequency *f*2 the output is effective from the NAND gate 6 (FIG. 2(*h*)). The output from the bistable is smoothed by an RC network 15 and appears in the form of mark-space pulses as shown in FIG. 2(*j*), from which it can be seen that the initial pulse occurring during the frequency *f*1 and during the frequency *f*2 from the appropriate NAND gate switches the bistable, the bistable changing its state between "mark" and "space" every time the frequency changes between *f*1 and *f*2. The essential reason for this mode of operation is that whereas the period of each monostable multivibrator 5 and 10 is constant the period of the sinusoidal input signal varies in inverse proportion to the frequency, any change in frequency being detected within two or three cycles in the example shown. Although this change can be decreased or increased within limits depending on the signal frequency and the monostable delays, it is to be borne in mind that the higher is the "frequency" of measurement, to recognize a change between *f*1 and *f*2 more rapidly, the greater is the likelihood of false triggering due to coincident spurious noise pulses etc.

Accordingly, a "mark" appears for the duration of the signal frequency *f*1 and a "space" appears for the duration of the signal frequency *f*2, and in this manner the input intelligence is distinguished at the output.

Where the input signals are regularly alternating between these two frequencies *f*1 and *f*2, e.g. where the information received has been derived from pulses having a repetition rate varying in accordance with an analogue value being measured, it is advantageous for the mark-space ratio to be unity (equal), particularly where the output has to be integrated to reconstitute the analogue value. For this purpose a control network 16 is provided for governing the time delay of monostable 10.

In particular, capacitor 17 is charged through resistor 18 during the "space" period and discharges through this same resistor during the "mark" period, discharge through resistor 19 being negligible. The potential across this capacitor is thus controlled by the mark-space period and this potential is turn controls the time delay of the monostable itself through the resistor 19, a decrease in the potential lengthening the time delay and an increase reducing this delay. By lengthening the time delay a change in frequency will be detected sooner so that the "mark" time will be shorter, with the "space" longer, and conversely by shortening the delay the "mark" will be longer and the "space" shorter. This can best be appreciated by reference to FIGS. 2(*k*) and 2(*m*) from which it can be seen that if the monostable delay FIG. 2(*k*) were extended, as shown, at the transition between *f*1 and *f*2 then the mark (FIG. 2(*m*)) would cease at the new trailing edge of this monostable waveform, i.e. sooner than before; the "space" period is, at the same time, extended. With the control network shown however, the capacitor 17 is being charged during the "space" period and discharged during the "mark" period through the same resistor 18 so that, since the mean potential on this capacitor must remain constant, the "mark" and "space"

periods themselves must remain equal with the time delay of the monostable 10 assuming a value in equilibrium.

This control network further effects a degree of compensation for temperature changes, ageing etc. since, should the delay period of the monostable change, the "mark" to "-space" ratio will also change establishing a new mean potential value on the capacitor 17 which in turn, will again reestablish an equal "mark" and "space" ratio, modifying the delay time so that it again assumes its equilibrium condition.

Although the invention has been described above with reference to one particular embodiment, it is to be understood that various alternations and modifications may be made without departing from the scope of this invention. For example, the principle by which the frequency discrimination is effected may be fulfilled with different logical elements than the particular ones shown. In addition, the output circuit employed has not been detailed since this can be designed to suit individual requirements, e.g. to provide a digital and/or analogue representation.

I claim:

1. A frequency discriminator responsive to input signals of two different frequencies, comprising:

a first monostable circuit triggered-on during each cycle of the signals and operable to develop one output during the unstable period and to develop another output during its stable period, a first coincidence gate conditioned by said one output, a second coincidence gate conditioned by said other output, a second monostable circuit triggered-on upon the transition of the first monostable from its unstable to its stable states, and a differentiator for developing a pulse to condition both the first and the second gates upon the transition of the second monostable from its unstable to its stable states, whereby the first gate produces an output following coincidence between this pulse and the said one output from the first monostable in response to the input signals effecting a frequency change in one sense and the second gate produces an output following coincidence between this pulse and the said other output in response to a frequency change in the other sense.

2. A frequency discriminator according to claim 1, comprising a differentiator connected between the first and second monostables and through which the second monostable is triggered-on.

3. A frequency discriminator according to claim 2, comprising a bistable circuit to which the two gates are connected, the bistable circuit being operable to assume one state following an output from the first gate and assume another state following an output from the second gate.

4. A frequency discriminator according to claim 3, comprising a time-control circuit for maintaining the changes-of-state of the bistable regular for regular changes between the two frequencies, said circuit including a storage capacitor in a feedback network from the output of the bistable to the second monostable for governing its unstable period.

5. A frequency discriminator according to claim 4, wherein the unstable period of the first monostable is less than the period of either input signal so that it is triggered-on during each cycle.

6. A frequency discriminator according to claim 5, wherein the unstable period of the second monostable extends over a plurality of cycles of the input signal.

7. A frequency discriminator responsive to input signals of two different frequencies, comprising:

a first monostable circuit triggered-on during each cycle of the signals and operable to develop one output during its unstable period and to develop another output during its stable period, a first coincidence gate conditioned by said one output, a second coincidence gate conditioned by said other output, a second monostable circuit triggered-on upon the transition of the first monostable from its unstable to its stable states, a differentiator for developing a pulse to condition both the first and the second gates upon the transition of the second monostable from its unstable to its stable states, whereby the first gate produces an output following coincidence between this pulse and the said one output from the first monostable in response to the input signals effecting a frequency change in one sense and the second gate produces an output following coincidence between this pulse and the said other output in response to a frequency change in the other sense, a bistable circuit to which the two gates are connected, the bistable being operable to assume one state following an output from the first gate and assume one state following an output from the first gate, and a time-control circuit for maintaining the changes-of-state of the bistable regular for regular changes between the two frequencies.